June 13, 1933.  H. MOSCHEL  1,914,036
SIDE DELIVERY RAKE
Filed March 22, 1930
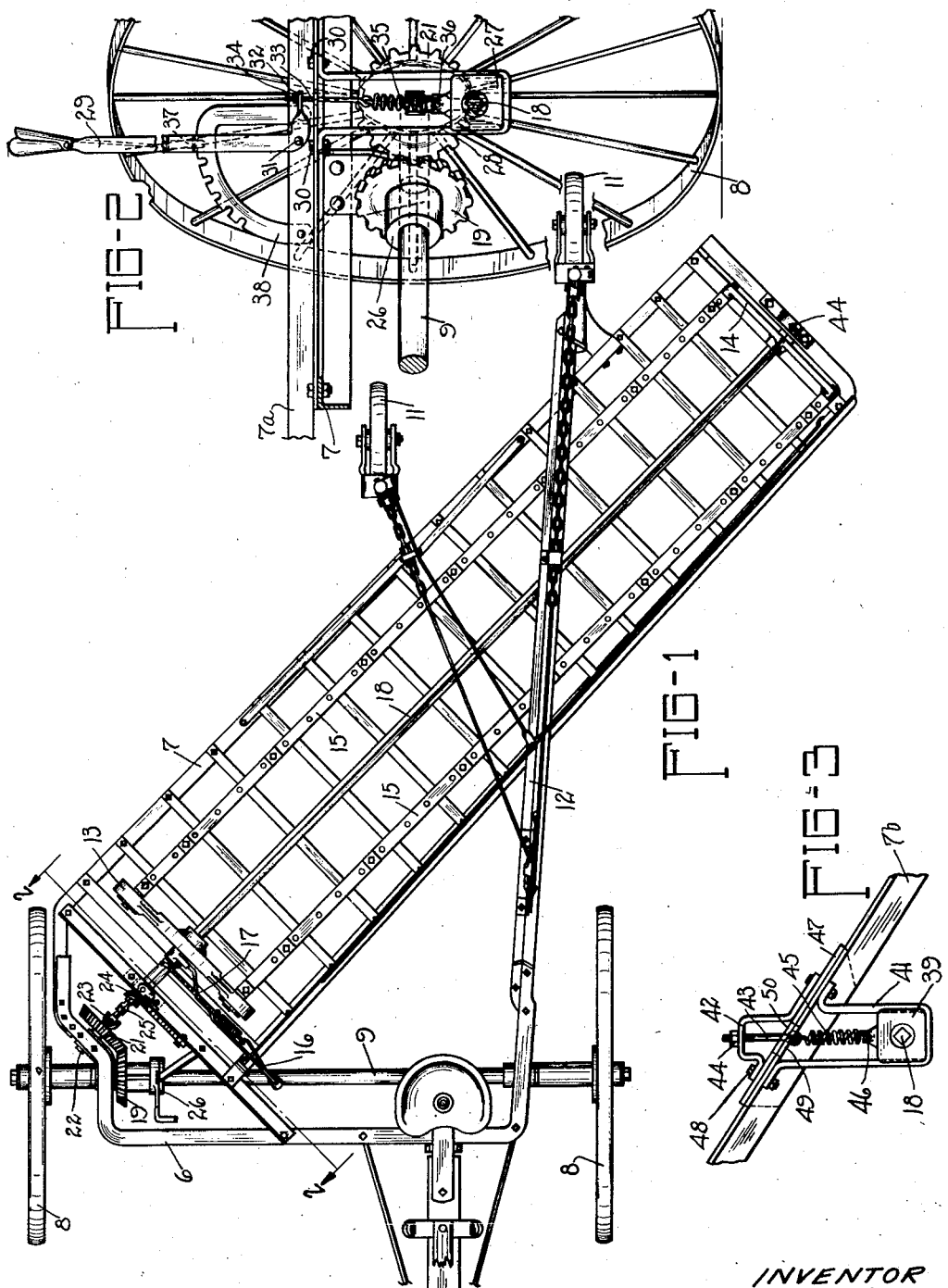
INVENTOR
Herman Moschel
BY
Brown, Jackson, Boettcher & Dienner
ATTORNEYS
WITNESS
Walter Ackerman Patented June 13, 1933

1,914,036

UNITED STATES PATENT OFFICE

HERMAN MOSCHEL, OF OTTUMWA, IOWA, ASSIGNOR TO DAIN MANUFACTURING COMPANY OF IOWA, OF OTTUMWA, IOWA, A CORPORATION OF IOWA

SIDE DELIVERY RAKE

Application filed March 22, 1930. Serial No. 438,010.

This invention relates to side delivery rakes of the type wherein a rotary reel is arranged at an angle to the line of draft, several series of rake-teeth being carried by the reel and all of such teeth being rotated in such relation as to be properly presented in effective working position to the hay to be raked. A rake of the general type to which this invention relates is illustrated and described in Patent No. 1,399,197, to Joseph Dain, dated December 6, 1921.

So far as I am aware in all prior rakes of this type it has been customary to so mount the reel that the ends thereof are carried in a fixed position in the frame. One end of the reel is frequently adjustable in height, but in all positions of adjustment the axis of the reel is in fixed or non-yielding relation to the frame. Such structures have been found objectionable because of the fact that when the rake is passing over undulating ground the reel may be placed under considerable beinding stress.

For example, if, during the operation of the rake, the rear carrying wheels should fall into a gulley so that said wheels do not entirely support the weight of the rear portion of the rake, a considerable portion of such weight will be thrown on to the reel owing to the fact that the teeth of the reel will come in contact with the ground, which is apt to cause serious bending of parts of the reel so that it will not thereafter operate properly, or it may even cause breakage of some of the parts.

It is the principal objection of my invention to provide means for supporting the reel on the frame whereby the above-mentioned objections will be overcome.

It is another object of my invention to provide spring means for yieldingly connecting the reel to the frame.

It is a further objection of my invention to provide spring means for suspending the reel from the frame whereby the reel may yield upwardly relatively to said frame under upwarly acting stresses exerted against the reel when the rake is traveling over uneven ground.

It is a still further object of my invention to provide means for adjusting the spring suspension means at the forward end of the reel vertically so as to change the normal vertical position of the forward end of the reel relative to the frame.

Other objects and advantageous features will be apparent from the following description of my invention taken in connection with the preferred embodiment thereof illustrated in the drawing, in which—

Fig. 1 is a plan view of a side delivery rake embodying my improvements;

Fig. 2 is a vertical sectional view taken on the line 2—2 of Fig. 1, illustrating the spring suspension means for the forward or inner end of the reel, and the means for adjusting the same vertically relatively to the frame; and Fig. 3 is a detail view illustrating the manner in which the rear or outer end of the reel is suspended from the frame.

Referring to the drawing, the frame of the machine comprises a front section 6 and a rear or reel carrying section 7 of any usual construction rigidly connected together in any appropriate manner, the reel carrying section extending diagonally rearwardly from the front section so that the hay operated upon will be moved laterally. The front section of the frame is suitably supported by a pair of carrying wheels 8, 8 which are mounted upon an axle 9. Such wheels and axle will be connected together by any suitable means so that the axle will be caused to rotate upon the forward movement of the machine, but it will not rotate when the machine is backed, as is conventional in rakes of this type. The reel carrying section 7 of the frame is suitably supported by laterally spaced rear caster wheels 11, 11, as shown, and the frame as a whole is suitably connected in any desired manner with the axle 9 so that when the reel frame is adjusted vertically relative to said rear caster wheels it will rock about such axle as an axis, as is also usual in machines of this type.

A common operating lever is provided for adjusting the frame relatively to the rear wheels, such lever being mounted on the long rearwardly extending truss member 12 of the frame. These adjusting devices have not been illustrated in detail and have only been briefly mentioned herein as they have nothing to do with my present invention and may be of any well-known construction such as that shown for example in the above-mentioned patent to Joseph Dain.

Rotatably mounted in the frame section 7 is the reel comprising inner and outer heads 13 and 14, respectively, which are connected together by a plurality of bars 15, generally three, that carry rake teeth. The inner head 13 has rotatably mounted therein a plurality of sets of gears, the number of sets corresponding in number to the number of tooth bars 15, and in the outer gear of each set the forward end of one of the tooth bars is secured, as is well known in these rakes. The inner gear of each of the sets of gears referred to is in mesh with a smaller central gear which is ordinarily held fixed against rotation, but which is so mounted that it may be rocked in order to effect a change in the position of the tooth bars so as to incline the teeth carried thereby as desired. For rocking this central gear I provide a lever 16 that interlocks with a pivoted sector 17. This gear structure has nothing to do with my present invention, and, therefore, has not been completely disclosed herein, but is fully shown and described in Letters Patent No. 1,283,674, to L. R. Clausen, dated November 5, 1918, and reference may be had to that patent for a full understanding thereof.

18 indicates the central shaft upon which the heads 13 and 14 of the reel are secured, and by the rotation of which shaft the reel as a whole is driven. The power for driving the reel is derived from the main axle 9 by the following mechanism. A bevel gear 19 is fixedly secured to said axle adjacent the inner or forward end of the reel frame 7, which gear is normally in mesh with a bevel pinion 21 suitably mounted on a stub shaft 22 journaled in a suitable bearing which is supported from the frame member 6 at a point adjacent to the main axle 9. Rigidly secured to the bevel pinion 21 so as to rotate therewith is a universal joint 23, and the inner or forward end of the central shaft 18 of the reel is also provided with a universal joint 24, and these two universal joints have connection with each other through a telescopic joint 25 as shown. It will thus be seen that the shaft 18 is rotated by power derived from the axle 9 through the driving mechanism just described. The gear 19, while normally held in mesh with the bevel pinion 21, may be thrown out of engagement therewith when desired by means of a suitable clutch mechanism mounted on the axle 9, which mechanism is indicated generally by the numeral 26. The parts so far described are old and well known in the art, being fully shown and described in the two above-mentioned patents, and hence it is believed that further description or illustration thereof is unnecessary.

Coming now to the parts with which my present invention is concerned, as best shown in Fig. 2 the forward end of the central shaft 18 of the reel or rake head is journaled in a bearing block 27 provided with vertically extending grooves on opposite sides for receiving the side members of a U-shaped supporting member 28 depending downwardly from the transverse cross-bar 7ª of the frame 7 and being secured at its upper end to said cross-bar by bolts 30, the support thus forming a guide for said bearing block in its vertical movement as hereinafter described. A lever 29 is pivotally mounted at 31 on the bar 7ª of the frame, said lever being provided with a laterally extending arm 32. The bearing block 27 is suspended from this arm 32 by means of a rod 33, adjustably secured at its upper end to said arm by means of a nut 34 threaded on the upper end of said rod, and a coiled spring 35 secured to and depending from the lower end of said rod, the lower end of said spring being connected in any appropriate manner with the upper end of the bearing block 27, as shown at 36.

The lever 29 is provided with a detent 37 which cooperates with a notched sector 38 mounted on the frame member 7ª as shown. This lever mechanism is provided at the forward end portion of the reel or rake head as it is sometimes desirable to raise such forward end relatively to the frame of the machine without at the same time raising the rear end of the rake head, or so that such forward end can be given a corresponding or a greater range of vertical movement with the adjustment of the rear ground engaging devices 11 relatively to the frame.

The universal joint and telescopic connection between the bevel pinion 21 and the shaft 18 is provided so that regardless of the vertical adjustment of the forward end of the reel the reel and tooth bars carried thereby will be driven as usual from the driving gear 19, as will be readily understood.

In Fig. 2 the parts are shown in the position they occupy when the shaft is in its lowermost position, and when in such position the spring is in extended condition. As will be apparent, if it is desired to raise said shaft to give a higher setting to the forward end of the reel, such can be readily accomplished by releasing the detent from the notch of the sector in which it rests and swinging said lever to the left as shown in Fig. 2 until the shaft 18 is raised to the position desired, when the detent is permitted to drop into one or another of the adjacent notches provided in the sector, and said shaft will then be held in that position.

The rear end of the shaft 18 is similarly yieldingly suspended from the inclined transverse frame member 7ᵇ at the rear end of the frame 7. This construction is shown in Fig. 3, and as there illustrated the shaft 18 is journaled in a bearing block 39 provided with vertically extending grooves on opposite sides for receiving the side members of a U-shaped supporting member 41 suitably secured at its upper end to the frame member 7ᵇ. Extending upwardly from the frame member 7ᵇ is a bracket member 42 substantially in the form of an inverted U, and the bearing block 39 is suspended from the member 42 by means of a rod 43, secured at its upper end to said member for vertical adjustment by a nut 44 threaded over the upper end of said rod, and by means of a coiled spring 45 secured to and depending from the lower end of said rod, the lower end of said spring being secured in any appropriate manner to the upper end of the bearing block 39, as shown at 46.

A reenforcing angle bar 47 is secured to the frame bar 7ᵇ between the bracket member 42 and said frame bar as shown, and said angle bar, the member 41 and the member 42 are all secured together and to the frame member 7ᵇ by means of the bolts 48 as shown. The member 7ᵇ is provided with an opening 49 alined with an opening 50 in the reenforcing angle bar 47 through which the rod 43 extends.

In the drawing I have illustrated the relative positions of the parts when the central shaft 18 of the reel is in its lowermost position, at which time the bearing blocks 27 and 39 in which said shaft is journaled are in their lowermost positions, resting on the lower ends of their U-shaped supporting members 28 and 41 and the springs by which these blocks are suspended are in expanded condition. Now when the machine with the parts in such position is traveling over level ground the parts will remain approximately in such position. When encountering gulleys, ditches or sharply rolling ground, if the front or rear wheels should drop into a depression or if the bottom rake teeth of the reel should strike the top of a rise in the ground, the strain which is imposed on the reel in contacting with the ground results solely from the weight of the reel, which the reel is capable of sustaining without injury, but the considerable weight of the frame 6, 7 and of the wheels, which is most likely to cause injury, is not imposed on the reel. This follows from the yieldable or floating mounting of the reel in the frame, afforded by the springs 35—45, which permit the frame to lower or the reel to rise, one relatively to the other, the bearing blocks 27—39 sliding upwardly freely in their guides 28—41 at this time. Hence the wheels remain in contact with the ground, sustainind the weight of the frame and preventing any part of the weight of the frame and wheels being imposed on the reel. This minimizes the possibility of bending or breaking the rake heads, tooth carrying bars or spring teeth. Since the springs 35—45 act solely in tension, being substantially incapable of acting in compression because of the rods 33—43 sliding upwardly in their upper mountings, the frame and wheels can lower relatively to the reel through substantially the full range of sliding movement of the bearing blocks 27—39 without imposing any part of the weight of the frame, operator or wheels on the reel.

It should also be pointed out that no matter to what vertical position the forward end of the shaft 18 may be adjusted by the lever 29, the spring 35 will always be in an extended condition, and the same is also true of any adjustment of the rod 43 in the bracket 42.

I wish it to be understood that my invention is not to be limited to the specific construction illustrated and described, as various modifications may occur to those skilled in the art.

I claim:

1. In a rotary rake, the combination of a frame, a reel-carrying frame section connected therewith, a rake-reel mounted in said reel-carrying frame section, and means yieldingly suspending said reel from said reel-carrying frame section.

2. In a rotary rake, the combination of a frame, a reel-carrying frame section connected therewith, a rake-reel mounted in said reel-carrying frame section, means yieldingly suspending said reel from said reel-carrying frame section, and means for rotating said reel.

3. In a rotary rake, the combination of a frame, a rake-reel, means yieldingly suspending said reel from said frame, and means mounted on said frame and operable through said first-named means for vertically adjusting said reel relatively to said frame.

4. In a rotary rake, the combination of a frame, a rotatable rake-reel, means yieldingly suspending said reel from said frame, means mounted on said frame and operable through said first-named means for vertically adjusting said reel relatively to said frame, and flexible drive means carried by the frame and operatively connected with said reel for rotating the same irrespective of the vertical adjustment thereof.

5. In a rotary rake, the combination of a frame, a rake-reel yieldingly suspended at both ends from said frame for relative vertical movement, and vertically extending guide means for guiding said reel in its vertical movement.

6. In a rotary rake, the combination of a frame, a reel-carrying frame section connected therewith, a rake-reel comprising a rotatable central shaft, means for rotating said shaft, and means for yieldingly suspending both ends of said shaft from said frame section.

7. In a rotary rake, the combination of a frame, a rake-reel comprising a rotatable central shaft, means yieldingly suspending both ends of said shaft from said frame, means for rotating said shaft, and means for adjusting one end of said shaft vertically relative to said frame.

8. In a rotary rake, the combination of a frame, vertically movable bearing blocks, a rake reel comprising a shaft having its ends journaled in said bearing blocks, means yieldingly supporting said bearing blocks from said frame, and means mounted on said frame and operable through said first-named means for vertically adjusting one end of said shaft relative to said frame.

9. In a rotary rake, the combination of a frame, a rake-reel comprising a rotatable central shaft, yieldable means suspending both ends of said shaft from said frame, means for adjusting one end of said shaft vertically relative to said frame, and flexible driving means connected with the adjustable end of said shaft for driving the same irrespective of the vertical adjustment thereof.

10. In a rotary rake, the combination of a frame, a rake-reel, and means yieldingly suspending said reel from said frame, said means comprising a tension spring secured at its lower end to said reel and at its upper end to said frame.

11. In a rotary rake, the combination of a frame, a rake-reel, means yieldingly suspending said reel from said frame, said means comprising a tension spring connected at its lower end with said reel, a rod connecting the upper end of said spring with said frame, and means cooperating with said rod for adjusting said rod vertically relative to said frame.

12. In a rotary rake, the combination of a frame, vertically movable bearing blocks supported by said frame, a rake-reel comprising a rotatable shaft journaled in said bearing blocks, means for supporting said bearing blocks on said frame, said supporting means comprising springs connected at their lower ends with said bearing blocks and having their upper ends connected with said frame, vertically extending grooves in said bearing blocks, and guide means carried by said frame and engaging in said grooves for guiding said bearing blocks in their vertical movement.

13. In a rotary rake, the combination of a frame, a rake-reel, a spring suspending said reel from said frame, and means mounted on said frame and operating through said spring for adjusting said reel vertically relative to said frame.

14. In a rotary rake, the combination of a frame, a rake-reel, a tension spring suspending said reel from said frame, and means mounted on said frame for shifting said spring bodily for adjusting said reel vertically relatively to said frame.

15. In a rotary rake, the combination of a frame, a rake-reel comprising a rotatable central shaft supporting by said frame, means for rotating said shaft, yielding means interposed between the ends of said shaft and said frame, and means mounted on the frame and operable through said yielding means for adjusting said shaft vertically relative to said frame.

In witness whereof I hereunto subscribe my name this 17th day of March, 1930.

HERMAN MOSCHEL.

CERTIFICATE OF CORRECTION.

Patent No. 1,914,036.  June 13, 1933.

HERMAN MOSCHEL.

It is hereby certified that error appears in the printed specification of the above numbered patent requiring correction as follows: Page 1, line 23, for "beinding" read "bending"; lines 36 and 43, for "objection" read "object"; page 3, line 62, for "sustainind" read "sustaining"; and line 128, claim 6, after "means" insert the words "between the ends of the shaft and said frame section"; page 4, line 70, claim 15, for "supporting" read "supported"; and that the said Letters Patent should be read with these corrections therein that the same may conform to the record of the case in the Patent Office.

Signed and sealed this 15th day of August, A. D. 1933.

M. J. Moore.
Acting Commissioner of Patents.

(Seal)